A. J. MEEKS.
RICE HEADER.
APPLICATION FILED DEC. 8, 1913.
1,128,172.
Patented Feb. 9, 1915.
3 SHEETS—SHEET 1.
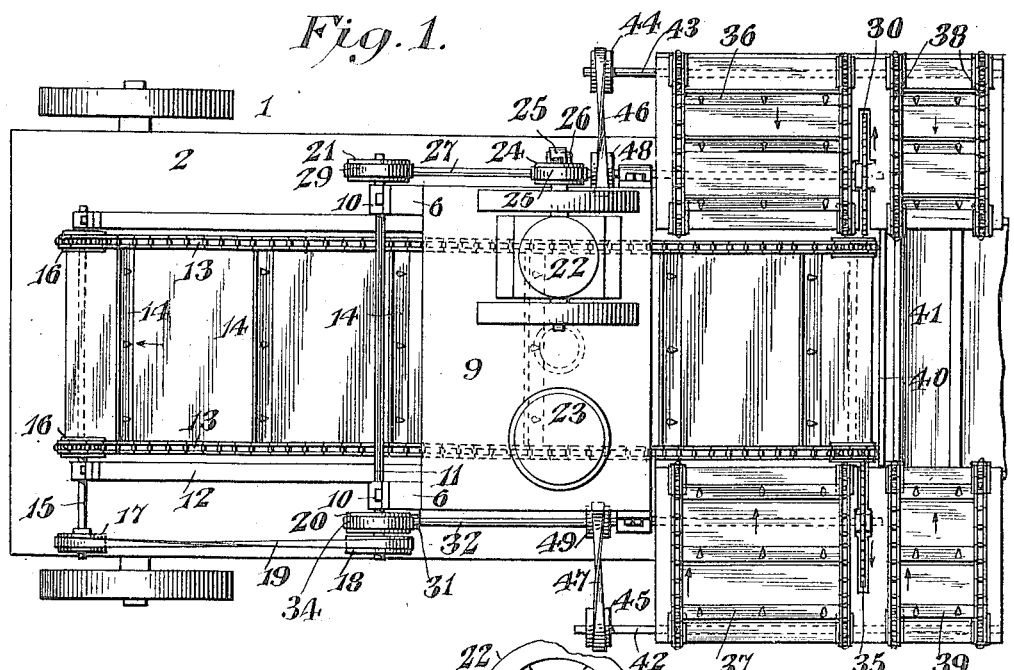
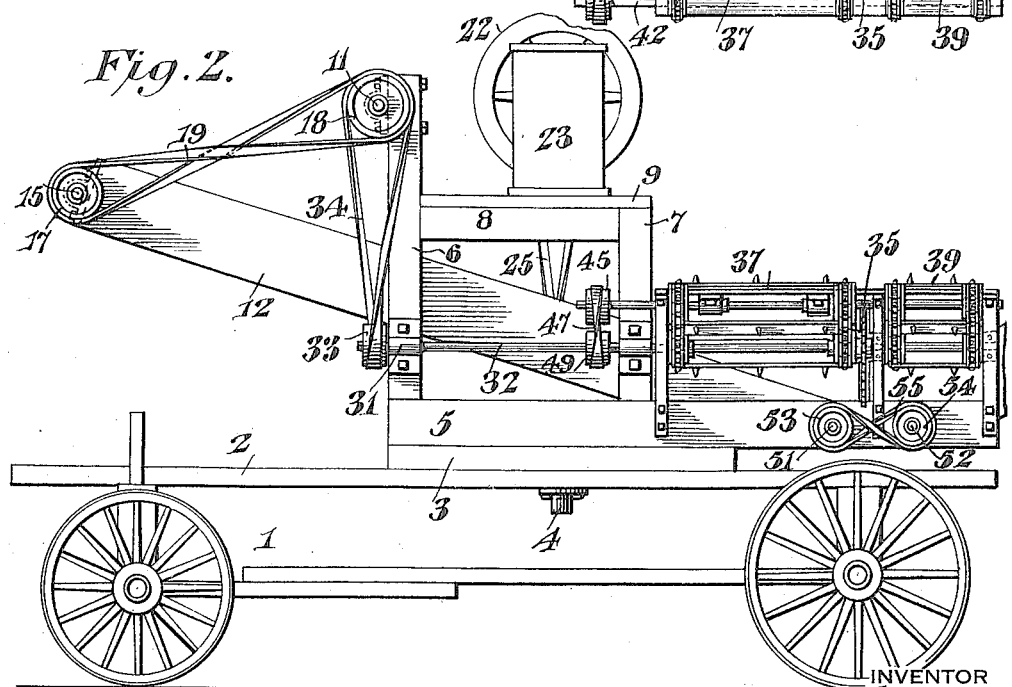
WITNESSES
Jas. K. McCathran
H. T. Chapman
INVENTOR
Anna J. Meeks,
BY
E. G. Siggers
ATTORNEY A. J. MEEKS.
RICE HEADER.
APPLICATION FILED DEC. 8, 1913.
1,128,172.
Patented Feb. 9, 1915.
3 SHEETS—SHEET 2.
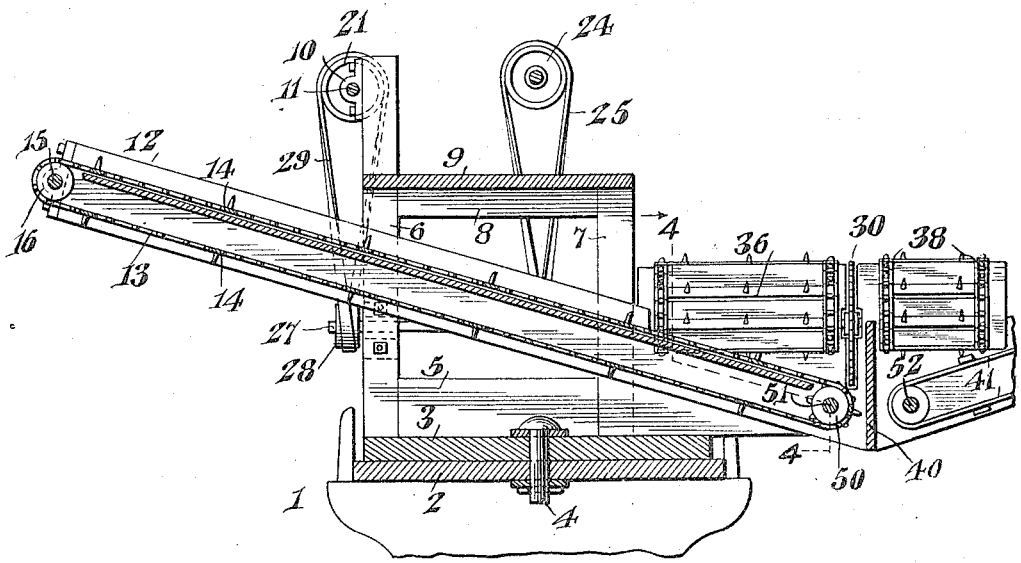
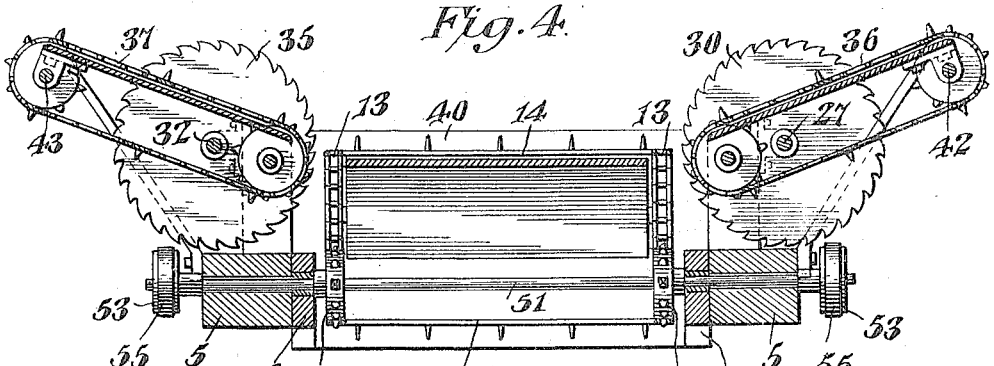
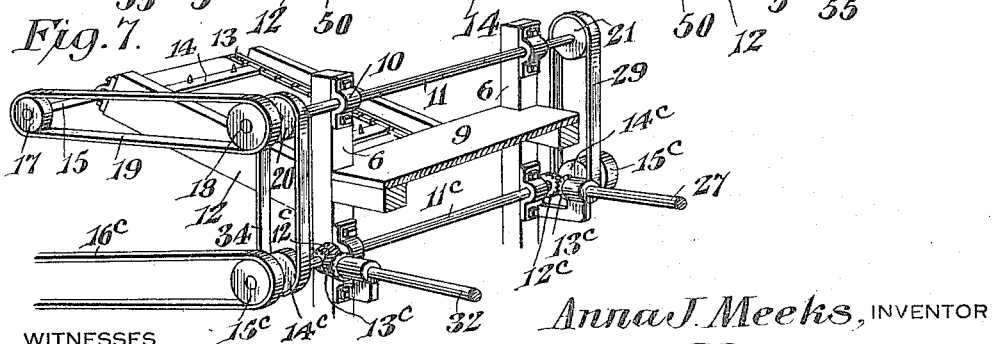
WITNESSES
Jas. K. McCathran
F. T. Chapman
Anna J. Meeks, INVENTOR
BY
E. G. Siggers
ATTORNEY

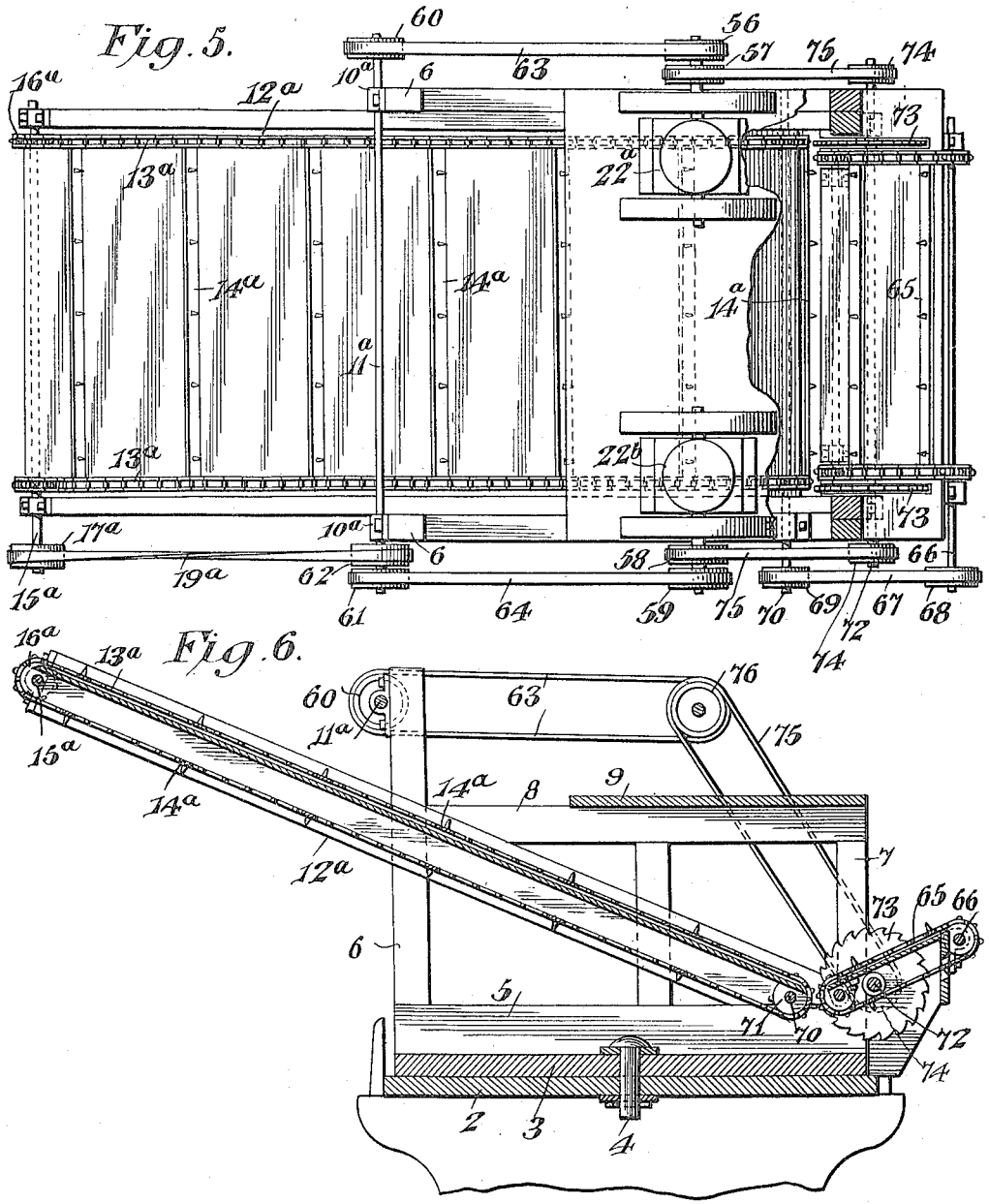

UNITED STATES PATENT OFFICE.

ANNA J. MEEKS, OF JENNINGS, LOUISIANA.

RICE-HEADER.

1,128,172.   Specification of Letters Patent.   Patented Feb. 9, 1915.

Application filed December 8, 1913. Serial No. 805,357.

*To all whom it may concern:*

Be it known that I, ANNA J. MEEKS, a citizen of the United States, residing at Jennings, in the parish of Jefferson Davis and State of Louisiana, have invented a new and useful Rice-Header, of which the following is a specification.

This invention has reference to improvements in rice headers and is designed to produce a machine of a readily portable nature capable of being taken into the rice field if needed, and operative to sever the butt ends of sheaves of rice from the head ends.

In accordance with the present invention there is provided a platform or base member so constructed as to be readily fastened to the top of a wagon frame by a heavy center bolt and elevated above the platform is a support for a motor of any suitable kind of which an ordinary explosion engine may be taken as typical. The platform or base carries one or more elevating conveyers arranged to deliver at a suitable height to either a separator or into a wagon, while at the lower end of the elevating conveyer there is placed a cutter, or, if desired, two cutters, which as well as the conveyer may be driven by the engine, so that the wet, heavy and muddy butts of the sheaves of rice are severed from the dry head ends, and the latter are carried to the separator or into another vehicle, the severed butts either dropping to the ground or into any conveyance by means of which they may be carried away.

The present invention is an improvement over the structure shown in application No. 755,904, for rice header filed by me on March 21, 1913, and is furthermore designed to greatly enlarge the capacity of the structure therein shown.

The invention will be best understood from a consideration of the following detailed description taken in connection with the accompanying drawings forming a part of this specification with the further understanding that while the drawings show a practical form of the invention, the latter is not confined to any strict conformity with the showing of the drawings, but may be changed and modified so long as such changes and modifications mark no material departure from the salient features of the invention.

In the drawings: Figure 1 is a plan view of a rice header of large capacity with a vehicle upon which it is mounted with the parts positioned for the transportation of the heading apparatus from place to place. Fig. 2 is an elevation of the structure shown in Fig. 1. Fig. 3 is a longitudinal vertical section. Fig. 4 is a section on the line 4—4 of Fig. 3 but drawn on a larger scale. Fig. 5 is a plan view of a somewhat modified form of header from that shown in Fig. 1 and omitting the vehicle. Fig. 6 is a longitudinal vertical section of the structure shown in Fig. 5. Fig. 7 is a perspective view showing another arrangement of shafting and belts.

Referring to the drawings, and more particularly to Figs. 1 to 4, there is shown a vehicle 1 provided with a platform 2, the showing of the drawings with respect to the vehicle being void of any particular detail and indicative of any suitable vehicle for the purpose. Supported by the platform 2 is another platform or base member 3, the two parts being connected by a single center pin 4 against accidental relative displacement, but permitting the turning of the platform 3 and parts carried thereby about an axis coincident with the longitudinal axis of the pin. The platform or basic member 3 has fast thereto on opposite sides timbers 5 spaced apart about the width of the platform 3, and rising from the timbers 5 are posts 6, 7, respectively, joined by cross pieces 8 and supporting a flooring 9, the posts 6 rising above said flooring and there carrying journal bearings 10 for a countershaft 11 to which reference will be hereinafter made. Mounted at the lower end on the beams 5 and at intermediate points on the posts 6 and 7 is an elevating conveyer structure 12, the moving parts of which may be made up of side sprocket chains 13 and connecting slats 14. In the upper end of the conveyer structure there is mounted a tranverse shaft 15 carrying sprocket wheels 16 about which the chains 13 run, and this shaft also carries a pulley 17 connected to another pulley 18 on the shaft 11 by a belt 19, while at opposite ends the shaft 11 carries other pulleys 20 and 21, respectively. Mounted on the flooring 9 is a prime mover 22 which may be in the form of an explosion engine, and preferably a gasolene engine, although any other power means suitable for the purpose may be employed. The flooring 9 is made large enough to accommodate not only the engine but a tank 23 for cooling water and any other parts which may be needed, but which are not disclosed in the drawings.

The power shaft of the engine is provided with a pulley 24 from which there extends a belt 25 to another pulley 26 on a shaft 27 mounted in bearings on suitable ones of the posts 6 and 7 and this shaft also carries another pulley 28 from which there extends a belt 29 to the pulley 21 on the shaft 11, thus transmitting power from the engine by way of the shaft 27 to the shaft 11 and from the latter to the shaft 15, and thereby actuating the conveyer chains 13 and slats 14. The shaft 27 is continued to a point about coincident with the lower end of the conveyer 12 and there carries a saw 30 which may be in the form of a circular saw, and this saw or cutter has a function to be described. On the side of the platform 3 remote from the shaft 27 and mounted in bearings 31 on respective posts 6 and 7 is another shaft 32 similar to the shaft 27 and provided at one end with a pulley 33 from which there extends a belt 34 about the pulley 20, wherefore the shaft 32 receives motion from the shaft 11 driven by the engine 22. At the end of the shaft 32 remote from the pulley 33 is a saw or cutter 35 similar to the saw 30 and similarly located but on the opposite side of the conveyer from the saw 30. Mounted on the beams 5 on opposite sides of the conveyer 12 are respective inclined conveyers 36 and 37 which structurally may be similar to the conveyer 12 both in the stationary and movable parts, and hence are only designated generally without attempt to specify the separate parts. The conveyers 36 and 37 are so arranged as to feed from opposite directions on to the lower end of the conveyer 12 and the latter is arranged to elevate the material fed upon it to a high point substantially coincident with the shaft 15, and from thence discharged. The conveyers 36 and 37 are located on the sides of the respective saws or cutters 30 and 35 toward the discharge end of the conveyer 13, while on the other side of the cutters 30 and 35 are respective conveyers 38 and 39 similar to the conveyers 36 and 37. At the lower or receiving end of the conveyer 12 is an upright division board 40, and rising therefrom in a direction away from the conveyer 12 is another conveyer 41 on to which the conveyers 38 and 39 discharge, the last-named conveyers being on one side of the division board 40, while the conveyers 36 and 37 and the saws 30 and 35 are on the other side thereof.

In order to drive the conveyers 36, 37 and 38 there are provided shafts 42 and 43. The shaft 43 has a pulley 44 thereon and the shaft 42 has a pulley 45 thereon, said pulleys being connected by respective belts 46 and 47 to pulleys 48 and 49 on the respective shafts 27 and 32. The lower end of the chains 13 extend about suitable sprocket wheels 50 on a shaft 51, while the lower end of the conveyer 41 is actuated by a shaft 52 and the shafts 51 and 52 are provided with pulleys 53 and 54, respectively, connected by a belt 55. It will be understood that the several belts are crossed wherever necessary to drive the shafts in the proper direction, so that the moving parts of the conveyer 12 will actively rise from the shaft 51 toward the shaft 15, the active parts of the conveyers 36, 37, 38 and 39 will move from the outer ends toward the inner ends of the conveyers and discharge upon the conveyers 12 and 41, the conveyer 41 will move away from the conveyer 12 and the cutters 30 and 35 will move in the opposite direction to the direction of travel of the conveyers 36 and 37, it being understood that these cutters rise to an extent above the active or upper surfaces of the respective conveyers.

The vehicle 1 provides a means whereby the structure may be conveyed from point to point and then the platform 3 is turned upon the pin 4 so that the conveyer 12 will discharge at a desired point which may be at the separator or into another vehicle traveling along with the vehicle 1. The engine 22 being in action, the several conveyers are moved in the respective directions and the cutters 30 and 35 are actuated also in the proper direction.

Two operators, one at each feeding conveyer 36 and 37, place the sheaves of rice with the wet butts engaged by the conveyers 38 and 39 and the dry head ends by the conveyers 36 and 37, respectively. With such a machine the sheaves are substantially parallel with the moving parts of the conveyer 12, while the respective feeding conveyers force the sheaves against the saws or cutters 30 or 35 as the case may be, and the wet butt ends are severed to be delivered by the conveyer 38 or 39 to the conveyer 41, or in the absence of such conveyer permitting the wet butt ends to drop to the ground while the dry head ends are deposited upon the conveyer 12 with the heads presented toward the upper discharge end of the conveyer, and such head ends are carried to the upper discharge end of the conveyer 12 to be delivered where desired. With such a machine the capacity is practically double that of a single machine such as illustrated in my application No. 755,904, before referred to. Instead of feeding the sheaves in a direction at substantially right angles to the travel of the conveyer 12 they may be fed in the same direction, but in such case the conveyer 12 is replaced by a wider conveyer shown generally at 12ª in Figs. 5 and 6 with the moving parts made up of chains or links 13ª and slats 14ª.

There is provided a vehicle platform 2, a swivel platform 3 with a pivot pin 4, side beams 5, posts 6 and 7, cross pieces 8 and flooring 9, as before, and if more power be desired the flooring 9 may carry two engines 22ª and 22ᵇ, as indicated in Fig. 5. The engine 22ª has its power shaft supplied with pulleys 56 and 57, and the engine 22ᵇ has its power shaft supplied with pulleys 58 and 59. There is also provided a countershaft 11ª similar to the countershaft 11 and mounted in bearings 10ª on the posts 6. The countershaft has pulleys 60 and 61 on respective ends and on one end another pulley 62. The pulleys 56 and 60 are connected by a belt 63 and the pulleys 59 and 61 are connected by a belt 64 so that power is transmitted from both engines to the countershaft 11ª, while the pulley 62 carries a belt 19ª similar to the belt 19 of the structure of Fig. 1, and this belt transmits power to the pulley 17ª on a shaft 15ª carrying sprocket wheels 16ª for the chains 13ª thereby driving the movable parts of the conveyer 12ª.

Approaching the lower end of the conveyer 12ª is a short feeding conveyer 65 which in general construction may agree with the conveyer 12ª and hence needs no particular description. One end of this conveyer is driven by a shaft 66 receiving power through a belt 67 carried about a pulley 68 of the shaft 66 and also about another pulley 69 on a shaft 70 carrying sprocket wheels 71 at the lower end of the conveyer 12ª and engaged by the chains 13ª, wherefore the movable parts of the conveyers 12ª and 65 travel in the same direction. Traversing the conveyer 65 is a shaft 72 having suitable bearings on the post 7 and this shaft carries cutters 73 on opposite sides of the conveyer 65. The shaft 72 has pulleys 74 at opposite ends receiving power through belts 75 extending around the pulleys 57 and 58 on the power shafts of the respective engines 22ª and 22ᵇ. The arrangement of belts and pulleys is such that the conveyers 12ª and 65 move in the same direction while the cutters 73 which may be in the form of circular saws have their active portions movable oppositely to the active run of the conveyer 65.

Two operators can feed sheaves of rice to the conveyer 65 with the head ends directed one toward the other transversely of the conveyer and the butt ends overhanging the sides of the machine. The wet butt ends as severed would then fall to the ground, while the dry head ends are directed to the conveyer 12ª to be elevated to the discharge end of the conveyer. Since the sheaves are placed upon the conveyer 65 transversely of its length and of the length of the conveyer 12ª, both conveyers are wide enough to receive two such sheaves in alinement, and hence the conveyers are considerably wider than in the form shown in Fig. 1. The action of the structure of Figs. 5 and 6 is generally the same as that of Fig. 1 and the structure of Figs. 5 and 6 differs from that of Fig. 1 and associated figures principally in the proportions and location of the parts. The capacity is the same in both cases and a single engine of suitable power as in Fig. 1, or two engines, as indicated in Fig. 5, in which case they may be of smaller type, may be employed with either structure.

The present invention is particularly adapted for handling rice in the sheaf, but may have an extent of use in other connections, and while it has been described with particular reference to rice, the word rice as used herein is to be understood as indicative of any suitable grain including rice itself.

It has been assumed in the foregoing description, that the prime mover, whether a gasolene engine or other device, is mounted on the platform or flooring 9, but it is sometimes preferable, especially when the structure is operated at the separator, to use the same motive power employed to drive the separator. For this purpose the structure may be provided with a countershaft 11ᶜ mounted on the sides of the posts 6 toward the posts 7 and extending across the machine below the elevator 12, as shown in Fig. 7. This shaft has bevel gears 12ᶜ at opposite ends meshing with other bevel gears 13ᶜ on the shafts 27 and 32. Beyond the gears 12ᶜ at each end of the shaft 11ᶜ are pulleys 14ᶜ, 15ᶜ, the pulleys 14ᶜ receiving the belts 29 and 34, and the pulleys 15ᶜ being provided so that either one may receive a belt 16ᶜ assumed to come from the separator (not shown) or the power source for the separator. If, however, it be desired to drive the machine, provided with shafting as indicated in Fig. 7, by one or more engines mounted on the platform 9, belting therefrom may be applied to either or both pulleys 15ᶜ.

It will be understood that the invention is not confined to any particular motive power or particular arrangement of shafting.

What is claimed is:—

1. An apparatus for the purpose described, comprising a single elevating conveyer of a width sufficient to accommodate the head ends of two sheaves of rice at a time, and conveying means on opposite sides of and delivering directly to the receiving end of the elevating conveyer and provided with means for severing the butt ends of the sheaves from the head ends before reaching the elevating conveyer, the side conveyers and severing means being positioned to deliver the head ends of the sheaves intact upon the elevating conveyer and to discharge the butt ends before reaching the elevating conveyer.

2. An apparatus for the purpose described, comprising a single conveyer of a width to simultaneously receive the head ends of two sheaves of grain, means for feeding two sheaves of grain simultaneously toward the conveyer, said feeding means each comprising two feeding means one active to the head end of a sheaf and the other to the butt end of the same sheaf, and means associated with each feeding means for severing the butt ends of the sheaves from the head ends before reaching the conveyer and for directing the severed butts away from the conveyer.

3. An apparatus for the purpose described, comprising a single elevating conveyer of a width sufficient to accommodate the head ends of two sheaves of grain at one time, feeding means for the sheaves located on opposite sides of the receiving end of the conveyer, and each comprising separate feeding means, one individual to the head end and the other to the butt end of a sheaf, and severing means for sheaves deposited on the feeding means for removing the butt ends of the sheaves before reaching the conveyer, the severing means being located between the separate members of each feeding means.

4. An apparatus for the purpose described, comprising an elevating conveyer, feeding means located on opposite sides of the receiving end of the conveyer and each comprising separate sheaf engaging means, one individual to the head ends of the sheaves and the other to the butt ends thereof, severing means for the butt ends of the sheaves located between the separate members of each feeding means to sever the butt ends before the sheaves reach the line of the conveyer, and an additional conveyer in line with and moving oppositely to the first-named conveyer and adapted to receive the severed butt ends and direct them away from the first-named conveyer.

5. An apparatus for the purpose described, comprising oppositely directed conveyers having their receiving ends at substantially the same level, feeding means individual to the respective conveyers and located on opposite sides of the receiving ends of both conveyers, and cutters individual to and associated with the feeding means on opposite sides of the receiving ends of the conveyers and each located between the feeding means on the same side of the conveyer with which the cutters are associated.

6. An apparatus for the purpose described, comprising a basic structure, a supporting structure pivotally mounted on the basic structure to turn thereon about an upright axis, oppositely directed conveyers mounted on the pivoted structure with their receiving ends adjacent and at substantially the same level, associated feeding means individual to the respective conveyers and located on opposite sides of the receiving ends thereof, cutters each associated with the associated feeding means on opposite sides of the receiving ends of the conveyers, and a prime mover carried by the pivoted structure and connected to the conveyers and cutters.

7. An apparatus for the purpose described, comprising a pivotally mounted structure adapted to turn about an upright axis, a single elevating conveyer mounted thereon and of a width sufficient to accommodate the head ends of two sheaves of grain at one time, and means on opposite sides of the receiving end of the conveyer for severing the butt ends of sheaves before reaching the elevating conveyer, whereby the head ends only of the sheaves are delivered to the elevator and the butt ends are diverted therefrom.

8. An apparatus for the purpose described, comprising a basic member, a structure mounted on the basic member to turn on an upright axis, a conveyer mounted on said structure to turn therewith, a prime mover mounted on the structure above the conveyer, feeding and severing means associated with the receiving end of the conveyer and also mounted on the structure to turn therewith, and motion transmitting means connected to the moving parts of the conveyer and feeding means and adapted to be driven by the prime mover carried by said structure.

9. An apparatus for the purpose described, comprising a vehicle and a structure pivotally mounted on the vehicle to turn thereon on an upright axis, said structure including an elevating conveyer, feeding and severing means for sheaves associated with the receiving end of the conveyer, and a support for the prime mover located above the pivotal support.

10. A portable rice header comprising a vehicle, and a structure mounted thereon and connected thereto by an upright pivot connection about which the structure may be moved, said structure including an elevating conveyer, a prime mover carried by the structure above the conveyer and the pivot support of the structure, and separate feeding means on opposite sides of the receiving end of the conveyer, each feeding means having a cutter associated therewith for severing the butt ends from sheaves of grain deposited upon the feeding means.

11. A portable rice header comprising a vehicle, and a structure mounted thereon and connected thereto by an upright pivot connection about which the structure may be moved, said structure including an elevating conveyer, a prime mover carried by the structure above the conveyer and the pivot support of the structure, and separate feeding means on opposite sides of the receiving end of the conveyer, each feeding means having a cutter associated therewith for severing the butt ends from sheaves of grain deposited upon the feeding means, and said structure having another conveyer and feeding means associated therewith and located with reference to the first conveyer and its feeding means for receiving and directing the butt ends of the sheaves.

In testimony, that I claim the foregoing as my own, I have hereto affixed my signature in the presence of two witnesses.

ANNA J. MEEKS.

Witnesses:
L. O. JACKSON,
ALFRED MAUND.

Copies of this patent may be obtained for five cents each, by addressing the "Commissioner of Patents, Washington, D. C."